US010902295B2

(12) United States Patent
Broyda

(10) Patent No.: US 10,902,295 B2
(45) Date of Patent: Jan. 26, 2021

(54) USING TRANSFORMATIONS TO VERIFY COMPUTER VISION QUALITY

(71) Applicant: SAP SE, Walldorf (DE)

(72) Inventor: Juliy Broyda, Bat Yam (IL)

(73) Assignee: SAP SE, Walldorf (DE)

( * ) Notice: Subject to any disclaimer, the term of this patent is extended or adjusted under 35 U.S.C. 154(b) by 133 days.

(21) Appl. No.: 16/270,910

(22) Filed: Feb. 8, 2019

(65) Prior Publication Data
US 2020/0257941 A1 Aug. 13, 2020

(51) Int. Cl.
| | | |
|---|---|---|
| G06K 9/62 | (2006.01) | |
| G06N 20/00 | (2019.01) | |
| G06N 3/08 | (2006.01) | |
| G06T 3/40 | (2006.01) | |
| G06T 3/60 | (2006.01) | |

(52) U.S. Cl.
CPC ........... *G06K 9/6262* (2013.01); *G06K 9/628* (2013.01); *G06K 9/6253* (2013.01); *G06K 9/6255* (2013.01); *G06K 9/6257* (2013.01); *G06N 3/08* (2013.01); *G06N 20/00* (2019.01); *G06T 3/40* (2013.01); *G06T 3/60* (2013.01)

(58) Field of Classification Search
CPC .. G06K 9/6262; G06K 9/6253; G06K 9/6255; G06K 9/6257; G06K 9/62; G06N 3/08; G06T 3/40; G06T 3/60
See application file for complete search history.

(56) References Cited

U.S. PATENT DOCUMENTS

| | | | | |
|---|---|---|---|---|
| 2013/0101199 | A1* | 4/2013 | Alexandrov | G06K 9/00147 382/133 |
| 2017/0316281 | A1* | 11/2017 | Criminisi | G06K 9/627 |
| 2018/0247107 | A1* | 8/2018 | Murthy | G06K 9/4628 |
| 2020/0242736 | A1* | 7/2020 | Liu | G06K 9/6256 |

OTHER PUBLICATIONS

Bloice, Marcus D. "Augmentor: An Image Augementation Library for Machine Learning" arXiv preprint arXiv:1708.04680 (2017). (Year: 2017).*

(Continued)

*Primary Examiner* — Kim Y Vu
*Assistant Examiner* — Molly Delaney
(74) *Attorney, Agent, or Firm* — Schwegman Lundberg & Woessner, P.A.

(57) ABSTRACT

Techniques for using image dataset transformations to verify the quality of a computer vision system are disclosed. In some example embodiments, a computer-implemented method comprises: accessing a database to obtain a reference image; generating a plurality of new images based on the reference image using a plurality of transformations, each one of the plurality of transformations being configured to change a corresponding visual property of the reference image; feeding the plurality of new images into an image classifier to generate a corresponding classification result for each one of the plurality of new images; determining that the image classifier does not satisfy one or more accuracy criteria based on the generated classification results for the plurality of new images; and based on the determining that the image classifier does not satisfy the one or more accuracy criteria, selectively performing a function.

20 Claims, 8 Drawing Sheets

(56) References Cited

OTHER PUBLICATIONS

"European Application Serial No. 19205677.8, European Search Report dated Apr. 29, 2020", 13 pgs.

Boutell, M, et al., "Image Transform Bootstrapping and its Applications to Semantic Scene Classification", IEEE Transactions on Systems, Man and Cybernetics. Part B: Cybernetics, vol. 35, No. 3 (Jun. 2005), 563-570.

Lopes, Teixeira Andre, et al., "Facial expression recognition with Convolutional Neural Networks: Coping with few data and the training sample order", Pattern Recognition, vol. 61, (Jul. 19, 2016), 610-628.

Raitoharju, Jenni, et al., "Data Enrichment in Fine-Grained Classification of Aquatic Macroinvertebrates", ICPR 2nd Workshop on Computer Vision for Analysis of Underwater Imagery. (Dec. 4, 2016), 43-48.

\* cited by examiner

USING TRANSFORMATIONS TO VERIFY COMPUTER VISION QUALITY

TECHNICAL FIELD

The present application relates generally to the technical field of neural networks, and, in various embodiments, to systems and methods for using image dataset transformations to verify the quality of a computer vision system.

BACKGROUND

Computer vision is a field of computer science that works on enabling computers to see, identify, and process images in the same way that human vision does, and then provide appropriate output. However, it is difficult to determine formally or by experiment if a computer vision system provides an acceptable level of quality (e.g., accuracy) before providing the computer vision system as a service, as labeled datasets that can be used for a quality verification process are limited and the diversity of the possible real-world input data is very high. Current labeled datasets for computer vision systems fail to address the real-world distortions that occur with images that can affect the performance quality of the computer vision system. This failure to address the real-world distortions in images is also found in training data used in the training of computer vision systems.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Example methods and systems for using image dataset transformations to verify the quality of a computer vision system are disclosed. In the following description, for purposes of explanation, numerous specific details are set forth in order to provide a thorough understanding of example embodiments. It will be evident, however, to one skilled in the art that the present embodiments can be practiced without these specific details.

In some example embodiments, a computer vision system is configured to apply transformations that mimic real-world distortions to a reference dataset of images and produce a new dataset of images that are much more diverse and closer to real-world data. The generation and application of this new dataset of images enables the computer vision system to better evaluate (e.g., estimate) a level of quality of the computer vision system in possible real-world use cases, thereby improving the functioning of the computer vision system.

The implementation of the features disclosed herein involves a non-generic, unconventional, and non-routine operation or combination of operations. By applying one or more of the solutions disclosed herein, some technical effects of the system and method of the present disclosure are to improve the quality (e.g., accuracy) of a computer vision system. As a result, the functioning of the computer vision system is improved. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
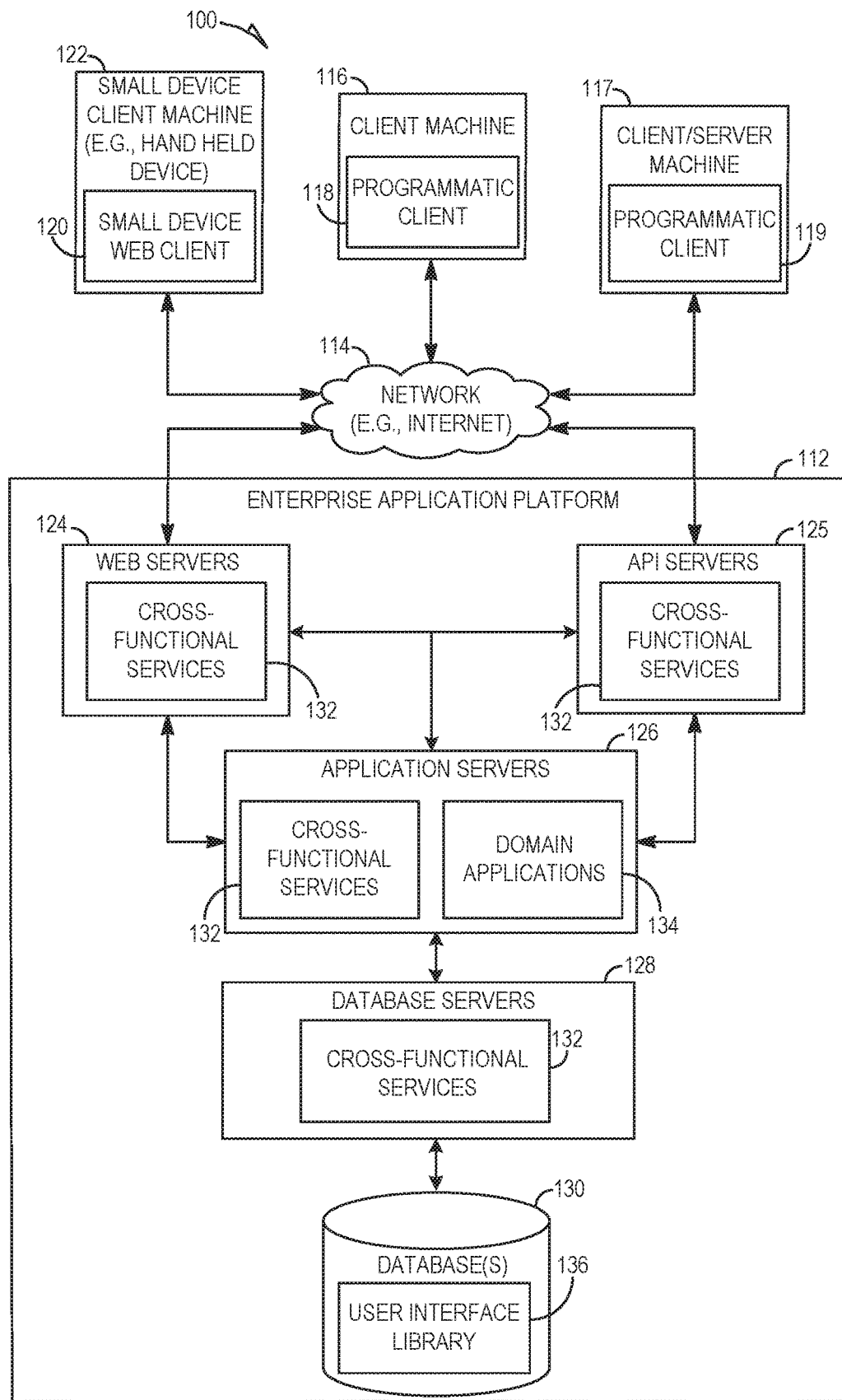
FIG. 1 is a network diagram illustrating a client-server system, in accordance with some example embodiments.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are, of course, not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-8.

Figure 2:
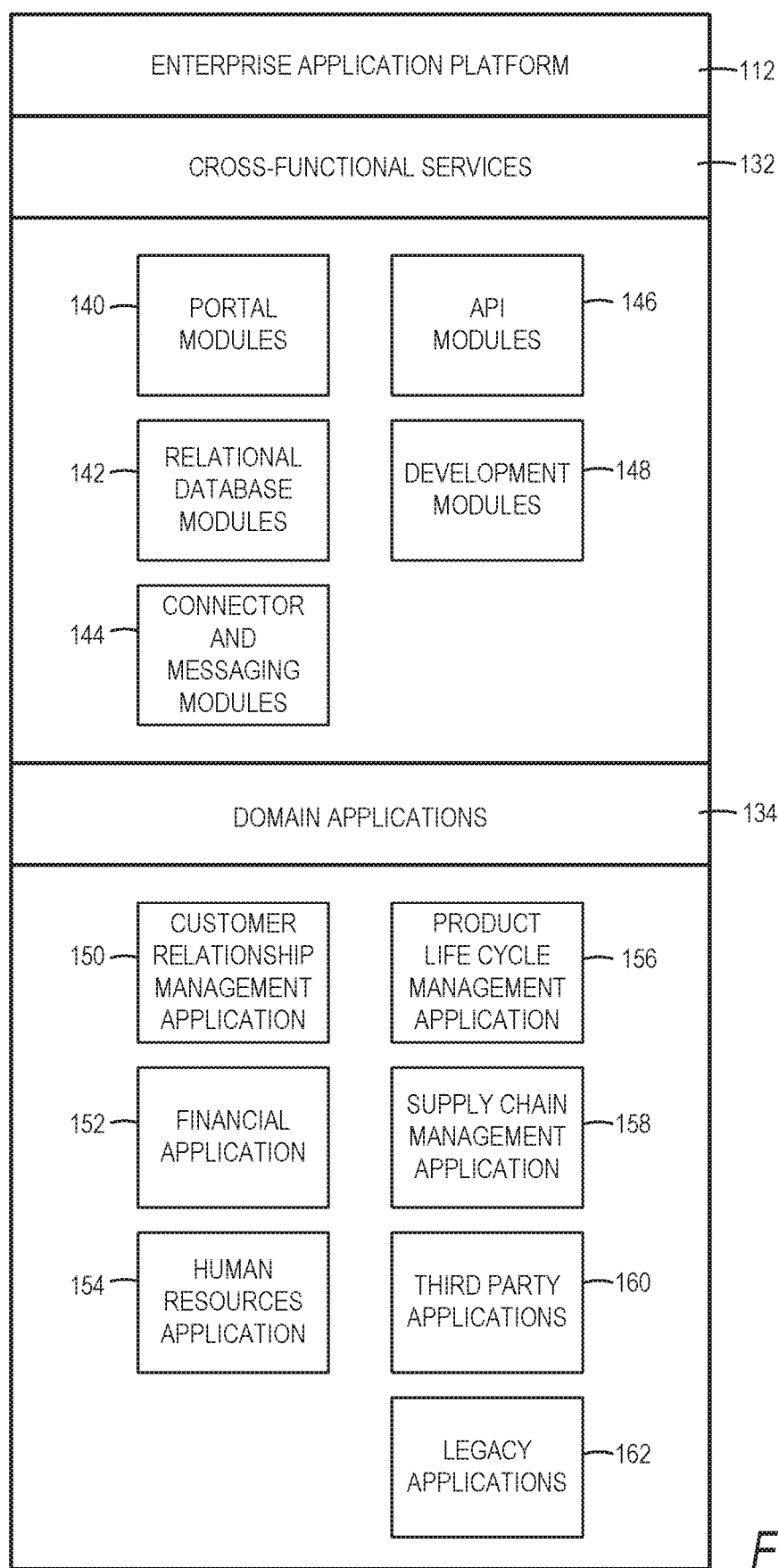
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ASAP®) and Web Dynpro, XML, JCA, JARS, X.509, LDAP, WSDL, WSRR, SOAP, UDDI and MICROSOFT® .NET®.

The relational database modules 142 can provide support services for access to the database(s) 130, which includes a user interface library 136. The relational database modules 142 can provide support for object relational mapping, database independence, and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real-time information.

The product life cycle management applications 156 can enable the management of a product throughout the life cycle of the product. For example, the product life cycle management applications 156 can enable collaborative engineering, custom product development, project management, asset management, and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
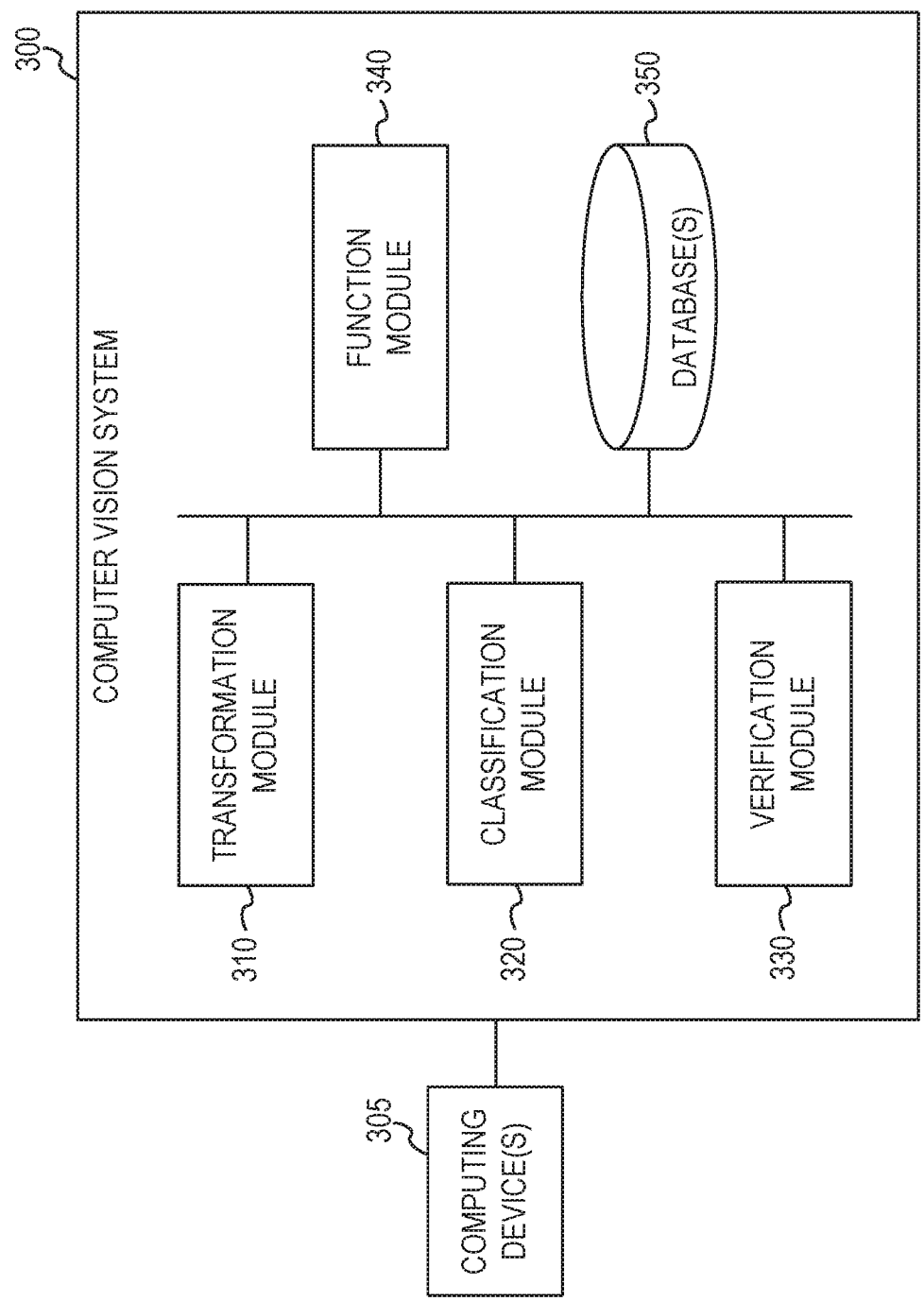
FIG. 3 is a block diagram illustrating a computer vision system, in accordance with some example embodiments.

FIG. 3 is a block diagram illustrating a computer vision system 300, in accordance with some example embodiments. In some example embodiments, the computer vision system 300 is configured to apply transformations that mimic real-world distortions to a reference dataset of images and produce a new dataset of images that are used to verify the quality of the computer vision system 300. In some embodiments, the computer vision system 300 comprises any combination of one or more of a transformation module 310, a classification module 320, a verification module 330, a function module 340, and one or more database(s) 350. The modules 310, 320, 330, and 340, and the database(s) 350 can reside on a computer system, or other machine, having a memory and at least one processor (not shown). In some embodiments, the modules 310, 320, 330, and 340, and the database(s) 350 can be incorporated into the application server(s) 126 in FIG. 1. However, it is contemplated that other configurations of the modules 310, 320, 330, and 340, and the database(s) 350, are also within the scope of the present disclosure.

In some example embodiments, one or more of the modules 310, 320, 330, and 340 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310, 320, 330, and 340 is configured to receive user input. For example, one or more of the modules 310, 320, 330, and 340 can present one or more GUI elements (e.g., drop-down menu, selectable buttons, text field) with which a user can submit input. In some example embodiments, one or more of the modules 310, 320, 330, and 340 is configured to perform various communication functions to facilitate the functionality described herein, such as by communicating with the computing device 305 via the network 114 using a wired or wireless connection.

In some example embodiments, the transformation module 310 accesses a database 350 to obtain a reference image. For example, a plurality of reference images may be stored in the database(s) 350, and the transformation module 310 may access and retrieve the reference images stored in the database(s) 350. Each reference image may comprise one or more objects captured in the reference image.

Figure 4A:
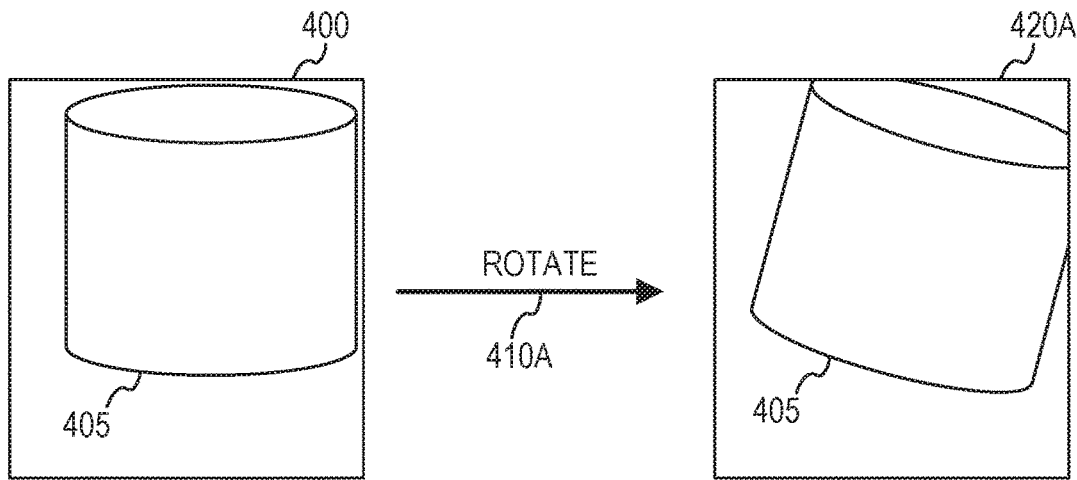
FIGS. 4A-4C illustrate different types of transformations being applied to a reference image in generating a new image, in accordance with some example embodiments.
Figure 4B:
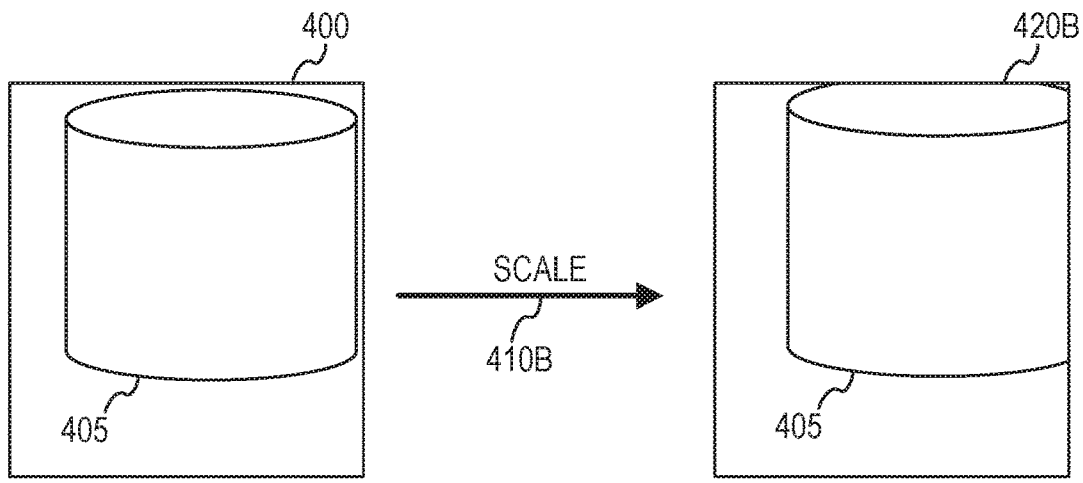
Figure 4C:
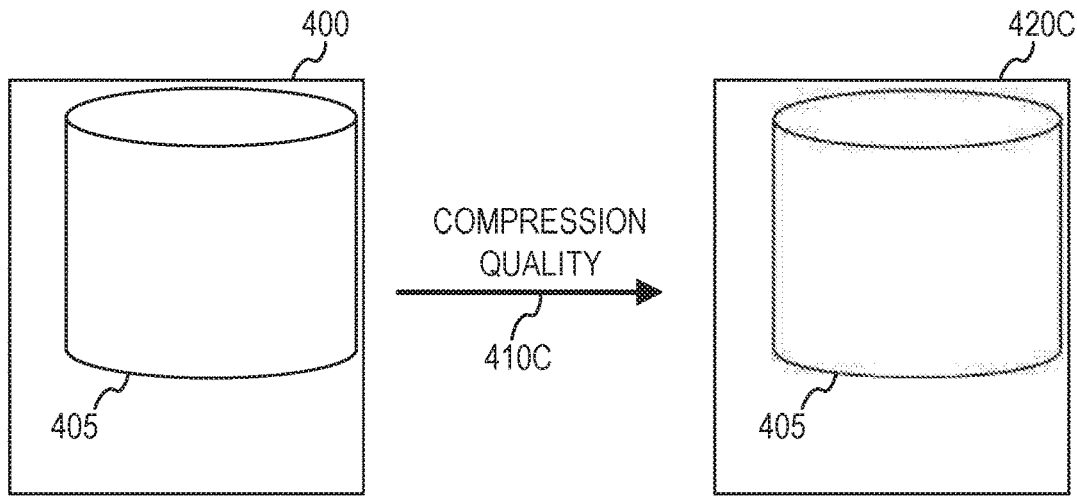

In some example embodiment, the transformation module 310 is configured to generate a plurality of new images based on the reference image using a plurality of transformations. Each one of the plurality of transformations may be configured to change a corresponding visual property of the reference image in order to simulate real-word distortions of an image. FIGS. 4A-4C illustrate different types of transformations 410A, 410B, and 410C, respectively, being applied to a reference image 400 in generating new images 420A, 420B, and 420C, respectively, in accordance with some example embodiments. Although the examples shown in FIGS. 4A-4C show the image 400 comprising a single object 405, it is contemplated that the image 400 may comprise multiple objects.

In FIG. 4A, the transformation 410A that is applied to the reference image 400 comprises rotating the reference image 400. By applying the transformation 410A, the transformation module 310 generates the new image 420A in which the object 405 has been rotated from its original orientation in the reference image 400. Although FIG. 4A shows a rotation about a single particular axis, it is contemplated that the transformation 410A may also comprise rotations about a different axis or multiple axes.

In FIG. 4B, the transformation 410B that is applied to the reference image 400 comprises scaling (e.g., resizing) a visual size of the reference image 400. By applying the transformation 410B, the transformation module 310 generates the new image 420B in which the object 405 has been resized from its original visual size in the reference image 400. Although FIG. 4B shows the transformation 410B comprising a resizing of the reference image 400 having the visual effect of zooming in towards the object 405, it is contemplated that the transformation 410B may also comprise a resizing of the reference image 400 having the visual effect of zooming out away from the object 405.

In FIG. 4C, the transformation 410C that is applied to the reference image 400 comprises changing a compression quality level of the reference image 400. Image compression comprises reducing the size in bytes of a graphics file, which consequently reduces the resolution of the graphics file. By applying the transformation 410C, the transformation module 310 generates the new image 420C in which the compression quality level of the object 405 has been changed from its original compression quality level in the reference image 400. FIG. 4C shows the transformation 410C comprising a decrease of the compression quality level of the reference image 400, which results in a decrease in resolution, thereby making the object 405 appear more blurry or pixelated in the new image 420C.

Figure 5:
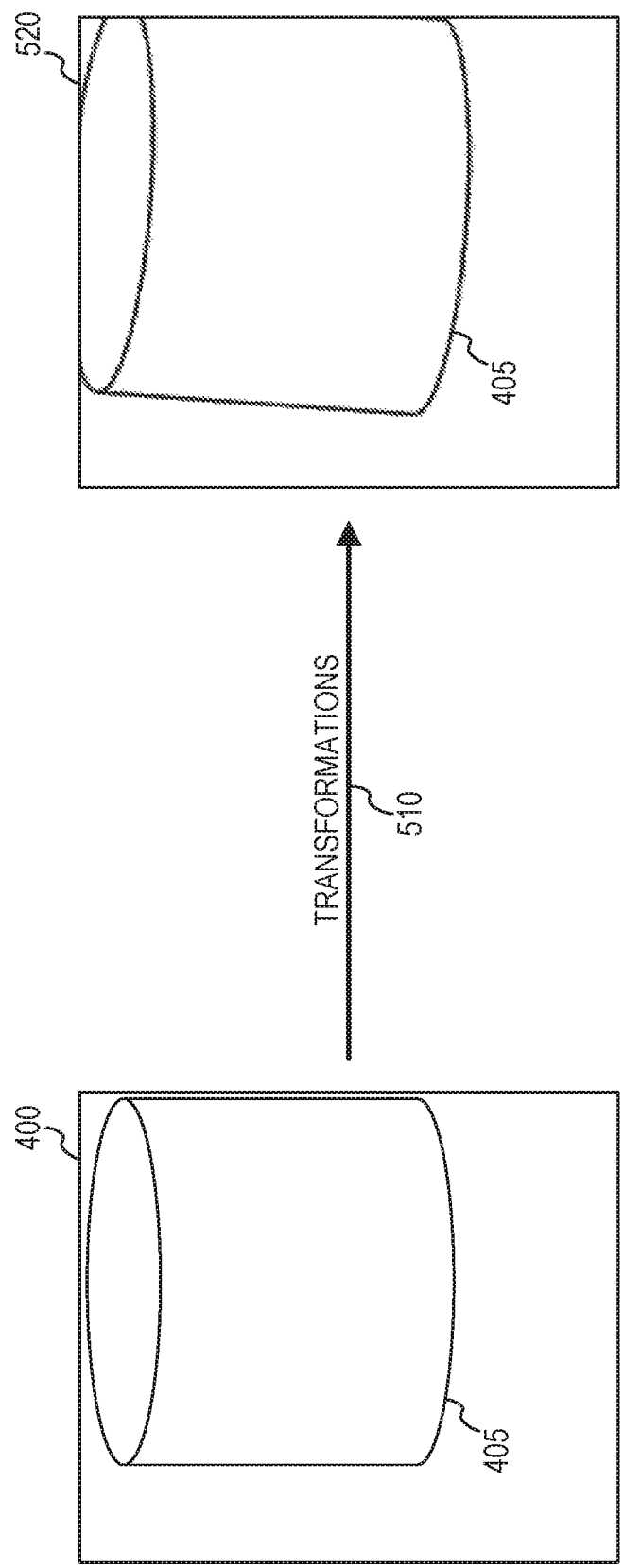
FIG. 5 illustrates multiple transformations being applied to a reference image in generating a new image, in accordance with some example embodiments.

Although FIGS. 4A-4C show single transformations 410A, 410B, and 410C being applied, respectively, to the reference image 400, in some example embodiments, the transformation module 310 applies multiple transformations to the reference image 400 in generating a new image. FIG. 5 illustrates multiple transformations 510 being applied to the reference image 400 in generating a new image 520, in accordance with some example embodiments. in the example shown in FIG. 5, the multiple transformations 510 comprise rotating the reference image 400, scaling (e.g., resizing) a visual size of the reference image 400, and changing a compression quality level of the reference image 400. It is contemplated that other types of transformations and other combinations of transformation types may be applied by the transformation module 310 to the reference image 400 in generating the new image 520.

In some example embodiments, the transformation module 310 is configured to generate the plurality of transformations to be applied to the reference image based on transformation parameters. For example, the transformation module 310 may receive a corresponding transformation parameter for each one of a plurality of transformation types (e.g., rotation, scaling, reducing compression quality level), and then generate the plurality of transformations based on the received transformation parameters. In some example embodiments, each transformation parameter comprises or otherwise indicates a measure, or some other detail, of how to apply the corresponding transformation to the reference image in generating the new image. For example, one transformation parameter may indicate a rotation of 10 degrees about an x-axis of the reference image, while another transformation parameter may indicate a upscaling of the visual size of the reference image by 10%, and yet another transformation parameter may indicate a reduction in a compression quality level of the reference image of 15%. In some example embodiments, each transformation parameter comprises or otherwise indicates a range of measures for how to apply the corresponding transformation to the reference image in generating the new image. For example, one transformation parameter may indicate a rotation range of +15 degrees about an x-axis of the reference image, while another transformation parameter may indicate a range of 50% to 150% of the visual size of the reference image in the scaling of the visual size of the reference image, and yet another transformation parameter may indicate a range of reduction in a compression quality level of the reference image of 0% to 40%.

Figure 6:
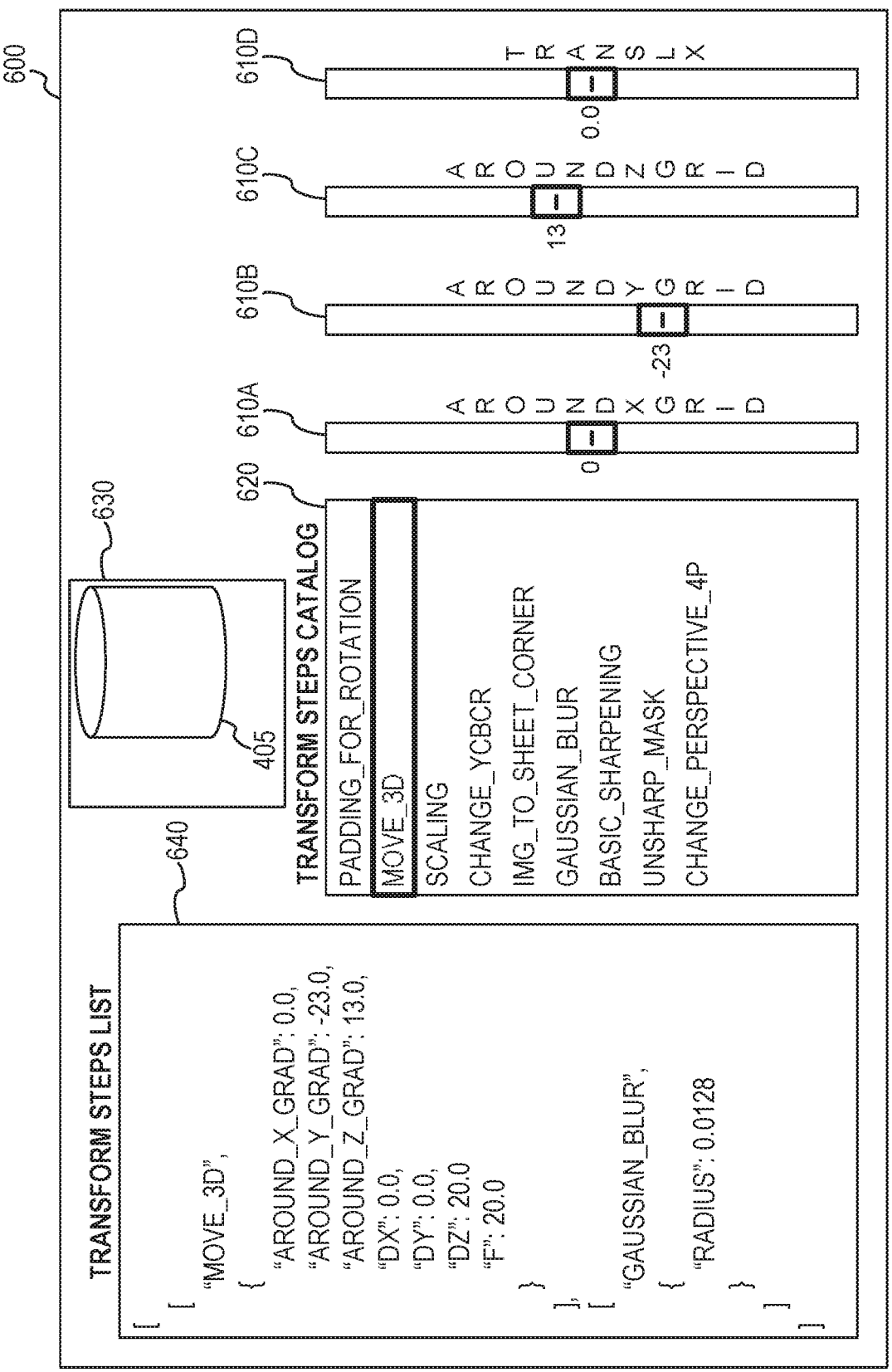
FIG. 6 illustrates a graphical user interface (GUI) configured to receive transformation parameters, in accordance with some example embodiments.

In some example embodiments, the transformation module 310 is configured to receive, via a user interface, user input indicating the transformation parameters. FIG. 6 illustrates a GUI 600 configured to receive transformation parameters, in accordance with some example embodiments. In FIG. 6, GUI 600 displays a plurality of user interface elements 610 each configured to enable a user to enter a configuration of a corresponding transformation parameter. For example, in FIG. 6, user interface elements 610A, 610B, 610C, and 610D each comprise a control element, such as a slider bar, that the user can manipulate to configure the corresponding transformation parameter (e.g., rotation around an x-grid, rotation around a y-grid, rotation around a z-grid, translation along an x-axis). The plurality of user interface elements 610 may correspond to a particular category, which may be selected by the user from a list of transformation categories or types 620, such that a selection of a particular transformation category or type from the list 620 results in a display of the corresponding user interface elements 610 for transformation parameters of the selected transformation category or type. In some example embodiments, in response to the user configuring a transformation parameter, corresponding code for the transformation parameter may be generated and displayed in a section 640 of the GUI 600. The code may be used in the implementation of the configured transformations of the reference image in generating the new image.

In some example embodiments, the plurality of transformations used by the transformation module 310 to generate one or more new images for a reference image comprises different combinations of the transformation types and a different combination of transformation values corresponding to the transformation types for each one of the different combinations of the transformation types. For example, the transformation module 310 may take three types of transformation, such as rotation, scaling, and reduction in compression quality level, and generate different sets of one or more of these three types of transformations. In some example embodiments, the transformation module 310 generates all possible sets of one or more of these three types of transformations:

1) Rotation
2) Rotation+Scaling
3) Rotation+Scaling+Reduction in Compression Quality Level
4) Rotation+Reduction in Compression Quality Level
5) Scaling
6) Scaling+Reduction in Compression Quality Level
7) Reduction in Compression Quality Level For each one of these sets, the transformation module 310 may generate different transformation values based on the corresponding transformation parameters. The different transformation values may be based on ranges indicated by the transformation parameters. In one example, for the second set above that consists of Rotation and Scaling, the transformation module 310 may generate different combinations of transformation values for Rotation and Scaling, such as:

1) Rotation: −15%; Scaling: 50% reduction
2) Rotation: −14%; Scaling: 50% reduction
3) Rotation: −13%; Scaling: 50% reduction
.
.
.
29) Rotation: +14%: Scaling: 50% reduction
30) Rotation: +15%; Scaling: 50% reduction
31) Rotation: −15%; Scaling 49% reduction
32) Rotation: −15%; Scaling 48% reduction
.
.
.

In some example embodiments, the transformation module 310 is configured to select a set of transformations by selecting points in a multidimensional transformation space created by a Cartesian product of transformation parameters (e.g., value ranges), and then generate a new test set of images by applying each transformation from the selected set of transformations to each reference image in a plurality of reference images. In sonic example embodiments, the transformation module 310 is configured to divide the transformation types into unions, and then build a transformation space for each union. The transformation module 310 may then select points from each transformation space, with each point denoting a certain transformation, resulting in different sets of transformations, where each set corresponds to its union of transformations.

In some example embodiments, the classification module 320 is configured to feed the plurality of new images into an image classifier to generate a corresponding classification result for each one of the plurality of new images. Each classification result may comprise a corresponding predicted class for one or more objects in the corresponding new image. For example, is a new image comprises a picture of two dogs, the image classifier may process the new image and generate a classification result indicating that the new image comprises two dogs, an indication of the specific breeds of the dogs, or an indication of some other type of classification corresponding to the two dogs. In some example embodiments, the image classifier comprises a neural network model, such as a convolutional neural network. However, other types of image classifiers are also within the scope of the present disclosure.

In some example embodiments, the verification module 330 is configured to determine that the image classifier does not satisfy one or more accuracy criteria based on the generated classification results for the plurality of new images. The accuracy criteria may comprise a requirement that at least a certain portion of the generated classification results represent accurate predictions of the corresponding new images. For example, the accuracy criteria may comprise a requirement that at least a particular portion (e.g., at least 75%) of the generated classification results match a comparison result or value that represents a correct prediction, such as a ground truth value or a classification result of the reference image. In some example embodiments, the verification module 330 is configured to determine that the image classifier does not satisfy the one or more accuracy criteria by receiving corresponding ground truth values for the plurality of new images (e.g., actual true classifications of the new images), and then comparing the generated classification results with the corresponding ground truth values to determine whether the generated classification results represent accurate predictions of the corresponding new images. In some example embodiments, the verification module 330 is configured to determine that the image classifier does not satisfy the one or more accuracy criteria by feeding the reference image into the image classifier to generate a corresponding classification result for the reference image, and then comparing the classification results of the plurality of new images with the classification result of the reference image to determine whether the generated classification results represent accurate predictions of the corresponding new images.

In some example embodiments, the determining of whether the image classifier satisfies the one or more accuracy criteria comprises calculating one or more accuracy values of the generated classification results for the plurality of new images, and the accuracy criteria comprises one or more requirements for the one or more accuracy values minimum threshold values to be satisfied). Such accuracy values may include, but are not limited, to any combination of one or more of an average recall value, a precision value, a mean average precision value, and an accuracy value. These accuracy values may be based on one or more of the number of true positives (TP), the number of true negatives (TN), the number of false positives (FP), and the number of false negatives (FN) found in the generates classification results for the plurality of new images. The terms true positives, true negatives, false positives, and false negatives compare the generates classification results of the image classifier under test with trusted external judgments (e.g., ground truth values or classification results of the reference image). The terms positive and negative refer to the image classifier's prediction (e.g., positive for classifying an object as being a particular thing, negative for classifying an object as not being a particular thing), and the terms true and false refer to whether that prediction corresponds to the external judgment (e.g., true for the classification being correct, false for the classification being incorrect), The average recall value, or the true positive rate, is a measure of how well the image classifier finds all of the actual positives among the plurality of new images and may be calculated using the formula below:

$$\frac{TP}{TP+FN}.$$

The precision value, or the positive predictive value, is a measure of how accurate the predictions are (e.g., the percentage of predictions that are correct) and may be calculated using the formula below:

$$\frac{TP}{TP+FP}.$$

The mean average precision value is the average of the maximum precisions at different recall values. The accuracy value is a measure of how well the image classifier correctly identifies or excludes a condition and may be calculated based on the proportion of true results (both true positives and true negatives) among the total number of cases examined:

$$\frac{TP+TN}{TP+TN+FP+FN}.$$

In some example embodiments, the determining of whether the image classifier satisfies the one or more accuracy criteria is implemented using the following pseudo-code:

1. Sum amount of all false positive detections (EP) at all images.
2. Sum amount of all true positive detections (TP) at all images.
3. Sum amount of all false negative detections (FN) at all images.
4. Sum amount of all true negative detections (TN) at all images.
5. Calculate recall based on results (FP, TP, FN and TN) of steps 1-4.
6. Calculate precision based on results (FP, TP, FN, and TN) of steps 1-4.
7. Check if recall is higher than minimum threshold.
8. Check is precision is higher than minimum threshold.
9. if steps 7 and 8 return true (e.g., recall and precision satisfy respective thresholds), then determine that the image classifier satisfies the one or more accuracy criteria; If steps 7 and 8 return false (e.g., recall or precision do not satisfy respective thresholds), then determine that the image classifier does not satisfy the one or more accuracy criteria.

In some example embodiments, the function module 340 is configured to perform a function in response to, or otherwise based on, the determination that the image classifier does not satisfy the one or more accuracy criteria. In some example embodiments, the function comprises displaying, on a user interface of a computing device, a notification that the image classifier does not satisfy the one or more accuracy criteria. In some example embodiments, the function comprises training the image classifier using the plurality of new images as training data in one or more machine learning operations. Other types of functions are also within the scope of the present disclosure.

Figure 7:
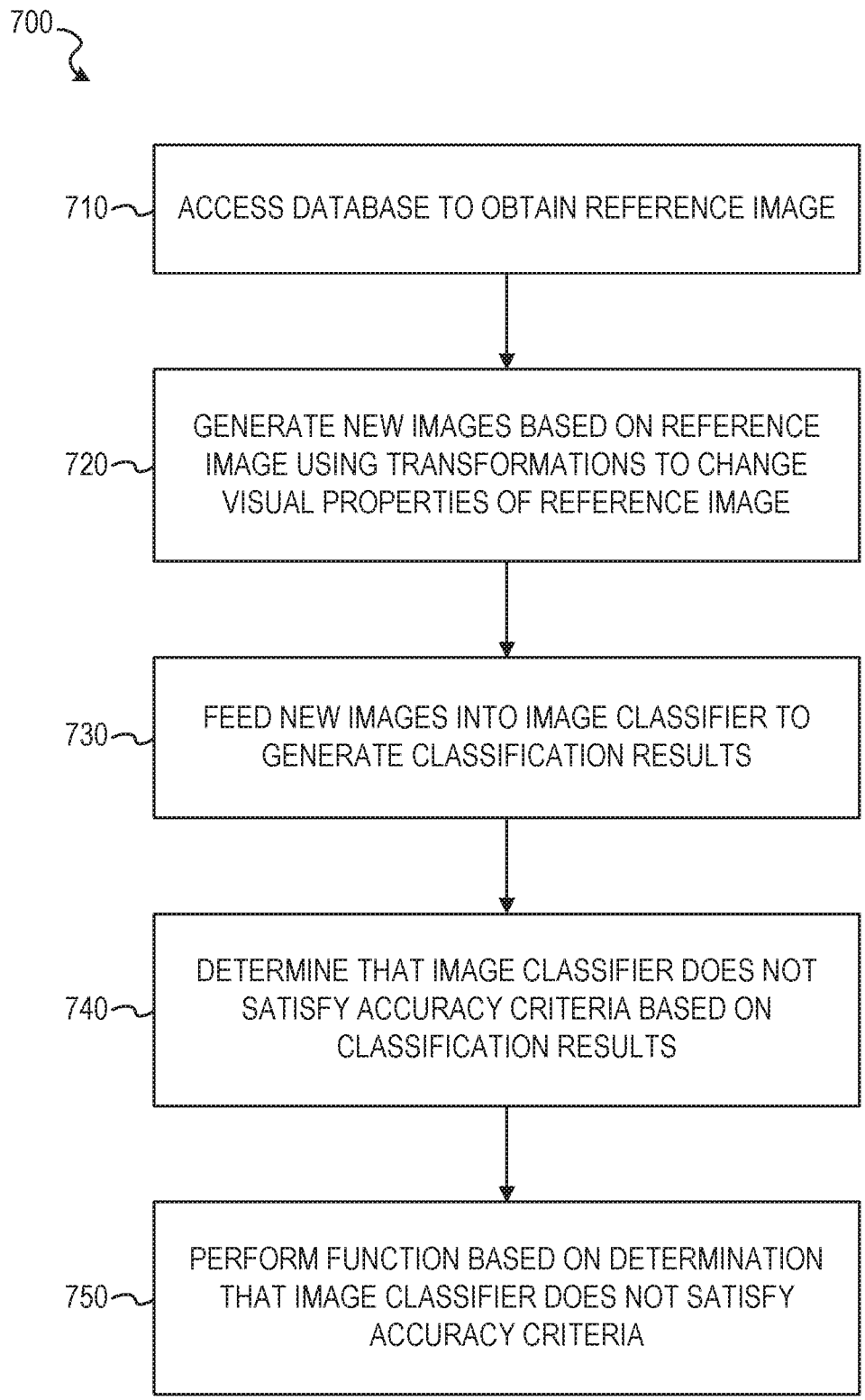
FIG. 7 is a flowchart illustrating a method of using image dataset transformations to verify the quality of a computer vision system, in accordance with some example embodiments.

FIG. 7 is a flowchart illustrating a method 700 of using image dataset transformations to verify the quality of a computer vision system, in accordance with some example embodiments. The method 700 can be performed by processing logic that can comprise hardware (e.g., circuitry, dedicated logic, programmable logic, microcode, etc.), software (e.g., instructions run on a processing device), or a combination thereof. In one example embodiment, the method 700 is performed by the computer vision system of FIG. 3, or any combination of one or more of its modules 310, 320, 330, and 340, as described above.

At operation 710, the computer vision system 300 accesses a database to obtain a reference image. At operation 720, the computer vision system 300 generates a plurality of new images based on the reference image using a plurality of transformations. Each one of the plurality of transformations may be configured to change a corresponding visual property of the reference image. In some example embodiments, the plurality of transformations comprises any combination of one or more of rotating the reference image, scaling a visual size of the reference image, and changing a compression quality level of the reference image. The generating of the plurality of new images may comprise receiving a corresponding transformation parameter for each one of a plurality of transformation types and generating the plurality of transformations based on the transformation parameters. In some example embodiments, the plurality of transformations comprises different combinations of the transformation types and a different combination of transformation values corresponding to the transformation types for each one of the different combinations of the transformation types. The receiving of the corresponding transformation parameter for each one of the plurality of transformation types may comprise receiving user input via a user interface. In some example embodiments, the user input indicates the transformation values for each one of the plurality of transformation types via a user interface.

At operation 730, the computer vision system 300 feeds the plurality of new images into an image classifier to generate a corresponding classification result for each one of the plurality of new images. In some example embodiments, the image classifier comprises a neural network model. For example, the neural network model may comprise a convolutional neural network model. However, other types of neural network models and other types of image classifiers are also within the scope of the present disclosure.

At operation 740, the computer vision system 300 determines that the image classifier does not satisfy one or more accuracy criteria based on the generated classification results for the plurality of new images. In some example embodiments, the determining that the image classifier does not satisfy the one or more accuracy criteria comprises receiving corresponding ground truth values for the plurality of new images and comparing the generated classification results with corresponding ground truth values. In some example embodiments, the determining that the image classifier does not satisfy the one or more accuracy criteria comprises feeding the reference image into the image classifier to generate a corresponding classification result for the reference image and comparing the classification results of the plurality of new images with the classification result of the reference image.

At operation 750, the computer vision system 300, in response to or otherwise based on the determining that the image classifier does not satisfy the one or more accuracy criteria, selectively performs a function. In some example embodiments, the function comprises displaying, on a user interface of a computing device, a notification that the image classifier does not satisfy the one or more accuracy criteria. In some example embodiments, the function comprises training the image classifier using the plurality of new images as training data in one or more machine learning operations. Other types of functions are also within the scope of the present disclosure.

It is contemplated that any of the other features described within the present disclosure can be incorporated into the method 700.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
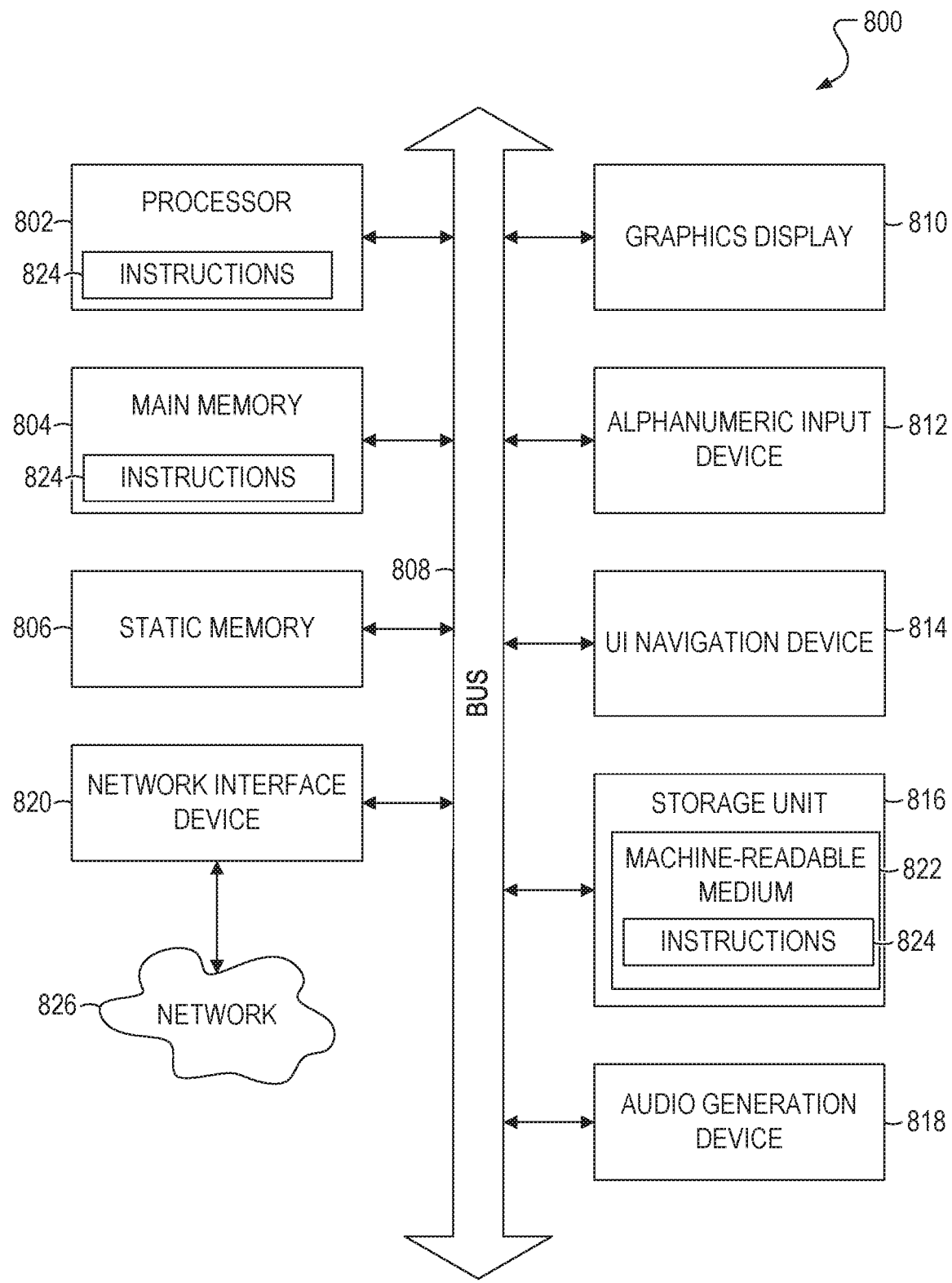
FIG. 8 is a block diagram of an example computer system on which methodologies described herein can be executed, in accordance with some example embodiments.

FIG. 8 is a block diagram of a machine in the example form of a computer system 800 within which instructions 824 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804, and a static memory 806, which communicate with each other via a bus 808. The computer system 800 may further include a graphics or video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a storage unit (e.g., a disk drive unit) 816, an audio or signal generation device 818 (e.g., a speaker), and a network interface device 820.

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may also reside, completely or at least partially, within the static memory 806.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

1. A computer-implemented method comprising:
accessing a database to obtain a reference image;
generating, by at least one hardware processor, a plurality of new images based on the reference image using a plurality of transformations, each one of the plurality of transformations being configured to change a corresponding visual property of the reference image;
feeding, by the at least one hardware processor, the plurality of new images into an image classifier to generate a corresponding classification result for each one of the plurality of new images;
determining, by the at least one hardware processor, that the image classifier does not satisfy one or more accuracy criteria based on the generated classification results for the plurality of new images; and
in response to or otherwise based on the determining that the image classifier does not satisfy the one or more accuracy criteria, selectively performing, by the at least one hardware processor, a function.

2. The computer-implemented method of example 1, wherein the plurality of transformations comprises rotating the reference image.

3. The computer-implemented method of example 1 or example 2, wherein the plurality of transformations comprises scaling a visual size of the reference image.

4. The computer-implemented method of any one of examples 1 to 3, wherein the plurality of transformations comprises changing a compression quality level of the reference image.

5. The computer-implemented method of any one of examples 1 to 4, wherein the generating the plurality of new images comprises:
   receiving a corresponding transformation parameter for each one of a plurality of transformation types; and
   generating the plurality of transformations based on the transformation parameters, the plurality of transformations comprising different combinations of the transformation types and a different combination of transformation values corresponding to the transformation types for each one of the different combinations of the transformation types.

6. The computer-implemented method of example 5, wherein the receiving the corresponding transformation parameter for each one of the plurality of transformation types comprises receiving user input via a user interface, the user input indicating the transformation values for each one of the plurality of transformation types via a user interface.

7. The computer-implemented method of any one of examples 1 to 6, wherein the image classifier comprises a neural network model.

8. The computer-implemented method of example 7, wherein the neural network model comprises a convolutional neural network model.

9. The computer-implemented method of any one of examples 1 to 8, wherein the one or more accuracy criteria comprises a requirement that at least a particular portion of the generated classification results match a comparison value that represents a correct prediction.

10. The computer-implemented method of any one of examples 1 to 9, wherein the determining that the image classifier does not satisfy the one or more accuracy criteria comprises:
    receiving corresponding ground truth values for the plurality of new images; and
    comparing the generated classification results with corresponding ground truth values.

11. The computer-implemented method of any one of examples 1 to 10, wherein the determining that the image classifier does not satisfy the one or more accuracy criteria comprises:
    feeding the reference image into the image classifier to generate a corresponding classification result for the reference image; and
    comparing the classification results of the plurality of new images with the classification result of the reference image.

12. The computer-implemented method of any one of examples 1 to 11, wherein the function comprises displaying, on a user interface of a computing device, a notification that the image classifier does not satisfy the one or more accuracy criteria.

13. The computer-implemented method of any one of examples 1 to 12, wherein the function comprises training the image classifier using the plurality of new images as training data in one or more machine learning operations.

14. A system comprising:
    at least one processor; and
    a non-transitory computer-readable medium storing executable instructions that, when executed, cause the at least one processor to perform the method of any one of examples 1 to 13.

15. A non-transitory machine-readable storage medium, tangibly embodying a set of instructions that, when executed by at least one processor, causes the at least one processor to perform the method of any one of examples 1 to 13.

16. A machine-readable medium carrying a set of instructions that, when executed by at least one processor, causes the at least one processor to carry out the method of any one of examples 1 to 13.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   accessing a database to obtain a reference image;
   generating, by at least one hardware processor, a plurality of new images based on the reference image using a plurality of transformations, each one of the plurality of transformations being configured to change a corresponding visual property of the reference image;
   feeding, by the at least one hardware processor, the plurality of new images into an image classifier to generate a corresponding classification result for each one of the plurality of new images;
   determining, by the at least one hardware processor, that the image classifier does not satisfy one or more accuracy criteria based on the generated classification results for the plurality of new images; and
   based on the determining that the image classifier does not satisfy the one or more accuracy criteria, selectively performing, by the at least one hardware processor, a function, the function comprises displaying, on a user interface of a computing device, a notification that the image classifier does not satisfy the one or more accuracy criteria.

2. The computer-implemented method of claim 1, wherein the plurality transformations comprises rotating the reference image.

3. The computer-implemented method of claim 1, wherein the plurality of transformations comprises scaling a visual size of the reference image.

4. The computer-implemented method of claim 1, wherein the plurality of transformations comprises changing a compression quality level of the reference image.

5. The computer-implemented method of claim 1, wherein the generating the plurality of new images comprises:
   receiving a corresponding transformation parameter for each one of a plurality of transformation types; and
   generating the plurality of transformations based on the transformation parameters, the plurality of transformations comprising different combinations of the transformation types and a different combination of transformation values corresponding to the transformation types for each one of the different combinations of the transformation types.

6. The computer-implemented method of claim 5, wherein the receiving the corresponding transformation parameter for each one of the plurality of transformation types comprises receiving user input via a user interface, the user input indicating the transformation values for each one of the plurality of transformation types via a user interface.

7. The computer-implemented method of claim 1, wherein the image classifier comprises a neural network model.

8. The computer-implemented method of claim 7, wherein the neural network model comprises a convolutional neural network model.

9. The computer-implemented method of claim 1, wherein the one or more accuracy criteria comprises a requirement that at least a particular portion of the generated classification results match a comparison value that represents a correct prediction.

10. The computer-implemented method of claim 1, wherein the determining that the image classifier does not satisfy the one or more accuracy criteria comprises:
receiving corresponding ground truth values for the plurality of new images; and
comparing the generated classification results with corresponding ground truth values.

11. The computer-implemented method of claim 1, wherein the determining that the image classifier does not satisfy the one or more accuracy criteria comprises:
feeding the reference image into the image classifier to generate a corresponding classification result for the reference image; and
comparing the classification results of the plurality of new images with the classification result of the reference image.

12. The computer-implemented method of claim 1, wherein the function comprises training the image classifier using the plurality of new images as training data in one or more machine learning operations.

13. A system comprising:
at least one processor; and
a non-transitory computer-readable medium storing executable instructions that, when executed, cause the at least one processor to perform operations comprising:
accessing a database to obtain a reference image;
generating a plurality of new images based on the reference image using a plurality of transformations, each one of the plurality of transformations being configured to change a corresponding visual property of the reference image;
feeding the plurality of new images into an image classifier to generate a corresponding classification result for each one of the plurality of new images;
determining that the image classifier does not satisfy one or more accuracy criteria based on the generated classification results for the plurality of new images; and
based on the determining that the image classifier does not satisfy the one or more accuracy criteria, selectively performing a function, the function comprises displaying, on a user interface of a computing device, a notification that the image classifier does not satisfy the one or more accuracy criteria.

14. The system of claim 13, wherein the plurality of transformations comprises rotating the reference image, scaling a visual size of the reference image, and changing a compression quality level of the reference image.

15. The system of claim 13, wherein the generating the plurality of new images comprises:
receiving a corresponding transformation parameter for each one of a plurality of transformation types; and
generating the plurality of transformations based on the transformation parameters, the plurality of transformations comprising different combinations of the transformation types and a different combination of transformation values corresponding to the transformation types for each one of the different combinations of the transformation types.

16. The system of claim 13, wherein the determining that the image classifier does not satisfy the one or more accuracy criteria comprises:
receiving corresponding ground truth values for the plurality of new images; and
comparing the generated classification results with corresponding ground truth values.

17. The system of claim 13, wherein the determining that the image classifier does not satisfy the one or more accuracy criteria comprises:
feeding the reference image into the image classifier to generate a corresponding classification result for the reference image; and
comparing the classification results of the plurality of new images with the classification result of the reference image.

18. The system of claim 13, wherein the function comprises:
training the image classifier using the plurality of new images as training data in one or more machine learning operations.

19. A non-transitory machine-readable storage medium, tangibly embodying a set of instructions that, when executed by at least one processor, causes the at least one processor to perform operations comprising:
accessing a database to obtain a reference image;
generating a plurality of new images based on the reference image using a plurality of transformations, each one of the plurality of transformations being configured to change a corresponding visual property of the reference image;
feeding the plurality of new images into an image classifier to generate a corresponding classification result for each one of the plurality of new images;
determining that the image classifier does not satisfy one or more accuracy criteria based on the generated classification results for the plurality of new images; and
based on the determining that the image classifier does not satisfy the one or more accuracy criteria, selectively performing a function, the function comprises displaying on a user interface of a computing device, a notification that the image classifier does not satisfy the one or more accuracy criteria.

20. The non-transitory machine-readable storage medium of claim 19, wherein the plurality of transformations comprises rotating the reference image, scaling a visual size of the reference image, and changing a compression quality level of the reference image.

* * * * *